US010072633B2

(12) United States Patent
Brogan et al.

(10) Patent No.: US 10,072,633 B2
(45) Date of Patent: Sep. 11, 2018

(54) WIND TURBINE OPERATION BASED ON A FREQUENCY OF AN AC OUTPUT VOLTAGE SIGNAL PROVIDED BY A POWER CONVERTER OF THE WIND TURBINE

(71) Applicant: SIEMENS AKTIENGESELLSCHAFT, München (DE)

(72) Inventors: Paul Brian Brogan, Glasgow (GB); Nikolaus Goldenbaum, Ry (DK); Jan Thisted, Tjele (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/175,079

(22) Filed: Jun. 7, 2016

(65) Prior Publication Data
US 2017/0009738 A1 Jan. 12, 2017

(30) Foreign Application Priority Data

Jul. 7, 2015 (EP) .................................... 15175613

(51) Int. Cl.
*F03D 7/04* (2006.01)
*H02J 3/38* (2006.01)
(Continued)

(52) U.S. Cl.
CPC ............ *F03D 7/042* (2013.01); *F03D 7/0276* (2013.01); *F03D 9/255* (2017.02); *H02J 3/386* (2013.01); *Y02E 10/725* (2013.01); *Y02E 10/763* (2013.01)

(58) Field of Classification Search
CPC ........ F03D 7/042; F03D 7/048; F03D 7/0276; F03D 9/003; H02J 3/386
See application file for complete search history.

(56) References Cited

U.S. PATENT DOCUMENTS

| 8,018,083 B2 * | 9/2011 | Larsen | H02J 3/36 290/44 |
| 2008/0093857 A1 * | 4/2008 | Stiesdal | F03D 7/0284 290/44 |

(Continued)

FOREIGN PATENT DOCUMENTS

| CN | 103429889 A | 12/2013 |
| DE | 19845903 A1 | 4/2000 |

(Continued)

OTHER PUBLICATIONS

Kjell Eriksson, Christer Liljegren, and Kent Söbrink. "HVDC Light Experiences Applicable for Power Transmission from Offshore Wind Power Parks", 42nd AIAA Aerospace Sciences Meeting and Exhibit, Aerospace Sciences Meetings, Jan. 5-8, 2004, Reno, NV.*

(Continued)

*Primary Examiner* — Robert Fennema
*Assistant Examiner* — Shon Foley
(74) *Attorney, Agent, or Firm* — Schmeiser Olsen & Watts LLP (57) ABSTRACT

A method for controlling the operation of a wind turbine which includes a mechanical drive train, an electric generator being mechanically connected to the drive train, and a power converter being electrically connected to the generator is provided. The method comprises (a) determining a frequency of an AC output voltage signal provided by the power converter; (b) recognizing, whether there has been a modification of the determined frequency with respect to a previously determined frequency, which modification is larger than a given threshold; (c) if the modification of the determined frequency is larger than the given threshold, changing a power reference signal for the wind turbine; (d) providing the changed power reference signal to a controller of the wind turbine; and (e) controlling the operation of the (Continued)

wind turbine on the basis of the changed power reference signal.

17 Claims, 3 Drawing Sheets

(51) Int. Cl.
*F03D 7/02* (2006.01)
*F03D 9/25* (2016.01)

(56) References Cited

U.S. PATENT DOCUMENTS

| | | |
|---|---|---|
| 2010/0038909 A1 | 2/2010 | Andersen et al. |
| 2011/0309804 A1 | 12/2011 | Yasugi |
| 2012/0098265 A1* | 4/2012 | Skaare ................ F03D 7/0272 290/53 |
| 2012/0104756 A1 | 5/2012 | Beekmann et al. |
| 2012/0139241 A1* | 6/2012 | Haj-Maharsi ......... F03D 7/0224 290/44 |
| 2012/0203385 A1* | 8/2012 | Kumar ..................... H02J 3/26 700/287 |
| 2012/0248772 A1 | 10/2012 | Shigemizu et al. |
| 2012/0327693 A1 | 12/2012 | Cousineau |
| 2013/0038059 A1* | 2/2013 | Andresen ............. F03D 7/0284 290/44 |
| 2013/0241209 A1 | 9/2013 | Andersen et al. |
| 2014/0092650 A1* | 4/2014 | Alston ..................... H02J 3/36 363/35 |
| 2014/0145440 A1 | 5/2014 | Gupta et al. |

FOREIGN PATENT DOCUMENTS

| | | |
|---|---|---|
| DE | 102013207255 A1 | 10/2014 |
| DE | 102013208410 A1 | 11/2014 |
| DE | 102013208474 A1 | 11/2014 |
| JP | S5849043 A | 3/1983 |
| JP | 2012521513 A | 9/2012 |
| WO | WO 2011158351 A1 | 12/2011 |
| WO | 2012137356 A1 | 10/2012 |

OTHER PUBLICATIONS

Mansour Mohseni et al: "Comparing Technical Connection Requirements for Large Wind Power Plants"; Power and Energy Society General Meeting 2011 IEEE; XP032055114; DOI: 10.1109/PES.2011.6039042; ISBN: 978-1-4577-1000-1; pp: 1-8.

European Extended Search Report dated Jan. 4, 2016, Application No. 15175613.7-1804; 11 pgs.

Japanese Office Action dated Jul. 3, 2017; Application No. 2016-135274; 8 Pgs.

Non-English Chinese OA dated Jun. 15, 2018 for Application No. 201610530082.X.

* cited by examiner

WIND TURBINE OPERATION BASED ON A FREQUENCY OF AN AC OUTPUT VOLTAGE SIGNAL PROVIDED BY A POWER CONVERTER OF THE WIND TURBINE

CROSS-REFERENCE TO RELATED APPLICATION

This application claims priority to European Application No. 15175613.7 having a filing date of Jul. 7, 2015 the entire contents of which are hereby incorporated by reference.

FIELD OF TECHNOLOGY

The following generally relates to the technical field of transmitting electrical power, which has been generated by a wind park comprising a plurality of wind turbines, from the wind park to a power grid. Specifically, the following relates to a method for operating a wind turbine allowing for an effective power transmission from a wind park comprising the wind turbine to a power grid. Further, the following relates to a wind turbine being capable of carrying out this wind turbine control method and to a method for controlling an overall power generation of a plurality of wind turbines of a wind park, wherein each wind turbine is capable of carrying out the mentioned wind turbine control method.

In this document the term "wind park" may be any arrangement comprising at least two wind turbines which generate electric power which is commonly provided to a utility grid. A "wind park" may also be denoted a "wind farm" or even more descriptive a "wind power plant". The wind park can be located offshore or onshore.

BACKGROUND

Wind turbines are used to convert mechanical wind energy to electrical energy in a clean and efficient way. In a wind turbine a mechanical drive train comprising a rotor with several rotor blades drives an electric generator, either directly or by means of a gearbox. The resulting alternating current (AC) frequency that is developed at stator terminals of the electric generator is directly proportional to the speed of rotation of the rotor. The voltage at the stator terminals also varies as a function of the rotational speed of the generator. For an optimum energy capture, this rotational speed varies according to the speed of the available wind driving the rotor blades. To limit the energy capture at high wind speeds and to avoid a potential damage of the rotor, the rotational speed of the generator may be controlled by altering the pitch angles of the rotor blades.

An adaptation of the variable voltage and frequency of the electric generator to a nominally fixed voltage and frequency of a power grid is typically achieved by a power converter. A power converter typically includes a generator bridge, which in normal operation operates as an active rectifier to supply power to a direct current (DC) link. The generator bridge can have any suitable topology with a series of semiconductor power switching devices fully controlled and regulated using a pulse width modulation (PWM) strategy. A power converter typically further comprises a network bridge which converts the DC power of the DC link to an AC power signal, which in voltage, frequency, and phase angle is matched to the respective electric quantities of the power grid. When transferring or shipping power from the network bridge or from a bus bar being connected to a plurality of network bridges (e.g. via respectively one transformer), apart from the amplitude also the relative phase of the voltage signal at the output of the network bridge or at the bus bar with respect to the phase of the power grid is an important quantity for the amount of power which can be transferred.

In this respect it is mentioned that this phase angle is associated with a certain back Electro Motive Force (back EMF), which in another approach for explaining an electric power transfer is necessary for shipping electric power to the power grid. In this approach the back EMF is generated by the power grid.

By contrast to an AC power connection it is however also possible to transfer the electric power being generated in particular by a plurality of wind turbines being assigned to a wind park to a power grid via a so called High Voltage Direct Current (HVDC) power connection. Such a solution may be in particular appropriate for an offshore wind park where the distance between (a) a wind turbine and (b) the respective onshore power grid is large (e.g. hundreds of kilometers). With long distances the electric power losses within an HVDC power transmission system are much smaller than the corresponding losses within an AC power transmission system, in which the inductive power losses caused in particular by the parasitic inductance of the respective cable are much larger.

In the following a power transmission from an offshore wind park via a HVDC power transmission system to an onshore power grid is described:
(1) Each one of a plurality of Offshore wind turbines (each comprising a power converter with a generator (AC-DC) bridge, a DC link, and a network (DC-AC) bridge produces a medium voltage AC power signal. The medium voltage AC power signals are collected at a first bus bar.
(2) The medium voltage AC power signals being collected at the first bus bar are transformed to a high voltage (HV) AC power signal via a transformer being erected offshore at a substation platform.
(3) The HVAC power signal and other HVAC power signals from other substation platforms are collected at a second bus bar and fed, as a common HVAC power signal, to a HVDC platform wherein the common HVAC power signal is converted to a DC power signal.
(4) The DC power signal is transmitted onshore via a (low loss) HVDC cable which may have a length of some more than 100 km.
(5) Onshore the DC power signal is fed to a (DC-AC) converter station which generates an AC power output signal. This AC power output signal is fed with an appropriate voltage and frequency respectively phase angle into the onshore AC power grid.

In this respect it is mentioned that with regard to inductance compared to the AC power grid the HVDC cable represents only a very weak power receptor which cannot provide for a significant back EMF being necessary for receiving electric power. Therefore, in order to allow for an effective power transfer the network (DC-AC) bridges of the wind turbines have to be operated in such a manner that the necessary back EMF is generated.

For converting the common HVAC power signal into the DC power signal at the HVDC platform (see item (3) above), a high power AC-DC converter may be used, which comprises altogether six power semiconductor switches, wherein respectively two power semiconductor switches are connected in series within one (out of three) half bridge paths each extending between the two DC output terminals of the high power AC-DC converter. The power semiconductor switches may be driven in a known manner by means of a Pulse Width Modulation (PWM). Such an AC-DC conversion has the advantage that by providing appropriate switching patterns a bi-directional power flow is possible. However, disadvantages of such an AC-DC conversion are that the high power AC-DC converter is a complex, large and extremely heavy entity. For a reliable operation air insulation must be provided.

Recently there has been proposed another approach for an AC-DC power conversion at the HVDC platform, which approach is based on the concept of a rectifier having six passive high power diodes. Again, respectively two high power diodes are connected in series within one (out of three) half bridge paths each extending between the two DC output terminals of the corresponding power rectifier. This approach has the advantage that the rectifier can be realized as an encapsulated device and in a simple and robust manner. Power losses within the rectifier are small and the operation of the rectifier does only require comparatively low maintenance costs.

However, a disadvantage of the "rectifier approach" may be that only a one way power flow is possible. In case power has to be transferred from the onshore power grid to the wind park a corresponding HVDC power transmission system must be equipped with a so called umbilical AC cable extending between the onshore power grid and the wind park parallel with respect to the HVDC power cable. A power transfer via the umbilical AC cable may be necessary e.g. during a start-up phase of at least some wind turbines of the wind park when the power generation of the other wind turbines is not sufficient in order to allow for a reliable start-up. A further challenge when using a (passive) rectifier is that the amplitude, the frequency, and the phase of the common HVAC power signal which is supposed to be rectified must be controlled exclusively by the DC-AC network bridges of each individual wind turbine.

It is pointed out that apart from an umbilical AC cable a wind park could also be powered, if necessary, by a local power source. Such a local power source could be battery storage, a generator, fuel cells, compressed air, thermal storage or pumped storage or possible combinations of various power sources.

SUMMARY

There may be a need for controlling characteristic quantities of a HVAC power signal which in a HVDC power transmission system has to be converted into a HVDC power signal.

According to a first aspect of the invention there is provided a method for controlling the operation of a wind turbine comprising (i) a mechanical drive train, (ii) an electric generator being mechanically connected to the drive train, and (iii) a power converter being electrically connected to the generator. The provided method comprises (a) determining a frequency of an AC output voltage signal provided by the power converter; (b) recognizing, whether there has been a modification of the determined frequency with respect to a previously determined frequency, which modification is larger than a given threshold; (c) if the modification of the determined frequency is larger than the given threshold, changing a power reference signal for the wind turbine; (d) providing the changed power reference signal to a controller of the wind turbine; and (e) controlling the operation of the wind turbine on the basis of the changed power reference signal.

This aspect of the invention is based on the idea that a potential power imbalance at a certain point or node within a power transmission system connecting the wind turbine and in particular a plurality of wind turbines of a wind park with a power grid (often also called utility grid) will cause a frequency variation. When detecting or monitoring the frequency and when further recognizing that this frequency has changed to or with a certain extent, the power imbalance can be reduced at least partially by changing or adjusting the power reference signal in an appropriate manner. Specifically, when it is recognized that the frequency has dropped at least with or to a predetermined extent, the power production of the wind turbine should be increased. As long as there is sufficient wind available this will be realized in a known manner by increasing the power reference signal. On the contrary, when it is recognized that the frequency has raised at least by or to a predetermined extent, the power production of the wind turbine should be decreased. This will be realized by decreasing the power reference signal.

With the described method it may be possible to coordinate the power production of a whole wind park automatically in a coordinated manner without requiring or reverting to coordination by means of a superordinate wind park controller which is often called a High Performance Park Pilot (HPPP) controller and which only allows for a comparatively slow control. Specifically, a coordinated control of the whole wind park can be effectively realized without the need of any exchange of control information between the individual wind turbines. In this concept each wind turbine acts as an individual entity but in a responsible manner with respect to the aim of achieving at least partially a power balance which is indicated by a stabilized frequency.

Descriptive speaking, the wind turbine may autonomously control its own active power output under normal conditions as it would be in a conventional wind turbine control procedure. In accordance with an embodiment of the invention the wind turbine can then, based on local measurements and/or derivations, make an autonomous decision to react in a certain way which is coordinated with the remainder wind turbines of a wind park, which are also making autonomous decisions.

The frequency of the AC output voltage signal may be determined (a) from voltage measurements at terminals of the wind turbine and/or (b) derived directly from internal control variables for the power converter. In the latter case the frequency can be e.g. determined from the angular speed of a rotating reference frame which is applied as part of a strategy for controlling the operation of semiconductor switches of a DC-AC network bridge of the power converter in order to generate the AC output voltage.

When determined from the internal control variables for the power converter, all or a selection of the different contributors to the angular frequency of the AC output voltage signal can be employed in order to achieve the desired performance/objective of the operation of the wind turbine.

According to a presently preferred embodiment the invention the frequency of the AC output voltage signal is derived respectively indirectly determined from an output of a power controller of the wind turbine. Thereby, a power error signal is translated into a frequency which could be understood as the normal reaction of a synchronous matching to a power (control) error signal. By contrast to a determination of the AC output voltage signal by means of a (direct) measurement of the AC output voltage using the power error signal may provide the advantage that the respective operational control would include a delay. Such a delay typically results in a reduced overall performance and potentially also in stability problems.

In the context of this document the term mechanical drive train is used for all mechanical components of the wind turbine which are provided for mechanically driving a rotor of the generator. Specifically, the drive train may include a wind rotor having preferably three rotor blades being mounted at a hub, a rotatable drive shaft connecting the hub with the rotor of the generator either in a direct manner or in an indirect manner via e.g. gear box.

According to an embodiment of the invention the frequency is determined at a node of a power transmission system connecting the power converter with a power grid, wherein the power transmission system comprises a High Voltage Direct Current, HVDC, power transmission line.

The described power balance control depending on the (monitored) frequency is in particular of advantage when a HVDC power transmission is used, because, as has already been mentioned above in the introductory section of this document, a HVDC portion of the power transmission system represents only a very weak power receptor providing only a very small back EMF which is necessary to ship electric power to the power grid (in the case of a diode rectifier, the provided back EMF is practically zero). Therefore, as has also already been mentioned above the necessary back EMF has to be generated by a network (DC-AC) bridge of the wind turbine. The described method allows for an easy and a reliable control of the operation of the wind turbine and in particular (of the DC-AC network bridge) of the power converter in such a manner that the necessary back EMF will be provided.

In this respect it is mentioned that typically the power grid is a AC power grid. This of course implies that at the end of the HVDC power transmission line, which end is assigned to the AC power grid, there must be installed an DC-AC power converter, which in a known manner converts the high power DC signal transferred via the HVDC power transmission line in a high power AC signal, which in frequency and phase is matched with the AC signal of the AC power grid.

According to a further embodiment of the invention the HVDC power transmission system comprises a rectifier. By contrast to an AC-DC converter which in principle could also be used and which typically comprises six power semiconductor switches, a rectifier is a much more simple power electric device which comprises only passive components, i.e. high power diodes. As has already been mentioned above, using a rectifier has the advantage that the AC-DC conversion can be accomplished within an encapsulated device and in a simple and robust manner. Power losses are comparatively small and the operation of the rectifier does only require comparatively low maintenance costs.

According to a further embodiment of the invention the HVDC power transmission system comprises an auxiliary power transmission line, which is electrically arranged in parallel with respect to the HVDC power transmission line and which connects the power grid with the node of the power transmission system.

The connection between the auxiliary power transmission line and the described node may be a direct connection or alternatively an indirect connection via one or more other devices of the power transmission system. The auxiliary power transmission line may be in particular an auxiliary AC power transmission line.

With respect to its capability of carrying a high current respectively power, the auxiliary power transmission line may be much weaker than the DC power transmission line.

Specifically, the auxiliary power transmission line may be used as a so called umbilical AC cable which may only be used for two purposes:
(1) When the power generation of the wind park is not sufficient in order to allow for a reliable start-up at least some of the wind turbines, e.g. after a period of no or extremely little wind, AC power must be transferred from the AC power grid to the at least some wind turbines.
(2) A lower power AC connection between the AC power grid and the mentioned node of the power transmission system may be used for measuring a phase angle between (a) the AC signal of the power grid, which AC signal is typically used as a reference for frequency and phase also for other power transmission systems or other wind parks, and (b) the AC signal being present at the wind park side of the power transmission system.

According to a further embodiment of the invention controlling the operation of the wind turbine on the basis of the changed power reference signal comprises (a) controlling the operation of the power converter and in particular controlling the operation of a DC-AC network bridge of the power converter; and/or (b) controlling a pitch angle of blades of a wind rotor of the wind turbine. This may provide the advantage that the changed power reference signal results to a correspondingly changed power production in an easy and reliable manner.

For controlling the operation of the power converter the power reference signal may be fed to the converter controller, which in a known manner controls the operation of in particular the DC-AC bridge by providing an appropriate pulse width modulation (PWM) to the respective power semiconductor switches.

For controlling or adjusting the pitch angle of at least one blade the power reference signal may be fed to a wind turbine controller which in a known manner may adjust the pitch angle in such a manner that the actual power production corresponds at least partially to the requested power production as indicated by the power reference signal. In other words, by controlling the pitch angle the amount or fraction of mechanical wind power which is converted into electric power can be adjusted in an easy and effective manner.

According to a further embodiment of the invention the modification of the determined frequency is an increase of the value of the determined frequency. Further, the given threshold is a predetermined upper boundary value for the determined frequency.

Descriptive speaking, changes of the power reference signal and in particular a lowering of the power reference signal will be initiated when the determined frequency reaches or crosses the predetermined upper boundary value.

In this respect it is mentioned that an increase of the frequency of the AC output voltage signal provided by the DC-AC network bridge of the power converter may indicate that the power transmission towards the AC power grid is blocked or is at least heavily reduced or curtailed. In such a situation, it is of great importance to reduce the power production very quickly in order to avoid damages in particular at the wind turbines. In view of the above elucidated advantage of the described method, i.e. in view of the matter of fact that within a wind park comprising a plurality of wind turbines each wind turbine can be controlled independently, a very fast reduction of the overall power production can be achieved. By contrast to a coordinated control of the wind park by means of a superordinate HPPP controller the response time for a power generation reduction being carried out with the described method is much shorter. Therefore, with the described method the operational reliability of a large power generation arrangement comprising the whole wind park and the power transmission system can be increased.

According to a further embodiment of the invention (a) the modification of the determined frequency is the absolute value of a change of the value of the determined frequency and (b) the given threshold is a predetermined threshold value for the absolute value of the change.

Descriptive speaking, the absolute value of the change defines, starting from a center frequency representing a power balance between the power generated by the wind park and the power being transferred to the AC power grid, two threshold values for the frequency. This means that a change of the power reference signal will be made when the determined frequency reaches or excesses an upper threshold value and when the determined frequency reaches or goes below a lower threshold value. Specifically, as has already been mentioned above, when the determined frequency reaches or excesses the upper threshold value, the power reference signal will be decreased and, correspondingly, when the determined frequency reaches or goes below the lower threshold value, the power reference signal will be increased. Both measures will contribute to achieve a (power) balance between the generated power and the power being shipped to the power network via the power transmission system.

In other words, the modification of the determined frequency (of the AC output voltage signal) may be given by a change of the frequency above an upper threshold or below a lower threshold. Thereby, the upper threshold determines a maximum positive change of the frequency and the lower threshold determines the maximum negative change of the frequency.

Defining threshold values for the determined frequency may provide the advantage that the operational control of the wind turbine can be realized in a very simple manner. As a consequence, also a power balance can be maintained.

According to a further embodiment of the invention the power reference signal is kept constant within a certain allowable frequency range.

In other words, a certain power imbalance corresponding to the certain allowable frequency range of the determined frequency will be accepted without changing the power reference signal. This may provide the advantage that the operational control of the wind turbine will be very simple and, in a consequence, also very reliable.

The allowable frequency range may be defined for instance by an upper frequency threshold and a lower frequency threshold.

According to a further embodiment of the invention (a) the modification of the determined frequency is a differentiation with respect to time of the determined frequency and (b) the given threshold condition comprises an upper boundary value for a value of the differentiation with respect to time of the determined frequency. This may provide the advantage that depending on a determined speed of the frequency change a proper change of the power reference signal can be accomplished in due time. Specifically, when there is a very strong and/or fast frequency change the described operational control of the wind turbine can react within a short period of time. This may contribute to a very high stability of the above mentioned power balance.

In this respect it is mentioned that it is obvious for a skilled person that calculating the differentiation with respect to time of the frequency of the AC output voltage signal provided by the power converter requires a determination of the frequency at least at two different points in time. This means the it is necessary to perform the further step of determining a further frequency of the AC output voltage signal provided by the power converter wherein the frequency and the further frequency are determined at different points in time.

Descriptive speaking, based on the derivative of the determined frequency of the absolute value or based on both (i) the derivative of the determined frequency and (ii) the determined frequency itself, a predetermined control procedure sequence can be initiated. Such a sequence could work by e.g. (a) reducing an active power limit to a preset value for a set time, and then (b) ramping back the active power with a set ramp rate until the wind turbine reaches a normal power production level.

According to a further embodiment of the invention the power reference signal for the wind turbine is confined within a predefined range.

In other words, independent from the magnitude of the frequency modification the allowable range for (the magnitude of) the power reference signal is restricted.

Descriptive speaking, according to this embodiment (the magnitude of) the power reference signal is clamped to either an upper limit of the defined range (in case there is a strong frequency drop) or to a lower limit of the defined range (in case there is a strong frequency increase). This clamping may provide the advantage that the operational control of the wind turbine will be further simplified and reliable. Specifically, by limiting or clamping the power reference signal in can be made sure that measurement failures will not lead to an uncontrollable operational situation.

It is pointed out that limiting or clamping the power reference signal will essentially allow the power reference of the wind turbine to be controlled in a normal manner (i.e. based on available active power production which is defined by the actual rotational speed of the wind rotor of the wind turbine and by the actual pitch angles of the blades of the wind rotor) when there is no significant active power imbalance present in the system and thus simplify the controls.

According to a further embodiment of the invention within the predefined range for the power reference signal a change of the power reference signal is proportional to the difference between (i) the determined frequency and (ii) a desired frequency corresponding to an operational state with a power balance between the power being generated by the wind turbine and the power being delivered to a power grid via a power transmission system. This may provide the advantage that the described operational control of the wind turbine is on the one hand very sensitive and on the other hand very simple.

According to a further aspect of the invention there is provided a method for controlling an overall power generation of a plurality of wind turbines of a wind park. Thereby, each wind turbine comprises (i) a mechanical drive train, (ii) an electric generator being mechanically connected to the drive train, and (iii) a power converter being electrically connected to the generator. Further, the plurality of power converters is electrically connected to a common node of a power transmission system connecting the wind park with a power grid. The provided method comprises controlling the operation of at least some and preferably of all wind turbines by respectively carrying out the method as described above. The frequency of the AC output voltage signal is determined at the common node.

This aspect of the invention is based on the idea, that a coordinated control of the whole wind park can be effectively and automatically realized even when treating each wind turbine as an independent or individual power generating device. Specifically, when carrying out the above described method for controlling the operation of the wind turbine, each wind turbine (controller) will act in a responsible manner with respect to the task being common for all wind turbines, namely to optimize the power transmission to the power grid. In this respect the inventors of the present invention have found out that this task will be solved in a simple and effective manner simply by monitoring the frequency at the common node, which frequency is indicative for a power balance respectively a power imbalance between the amount of power being generated by the entire wind park and the amount of power being received by the power grid. In accordance with the present invention (the level of) a power reference signal is adjusted based on the determined respectively monitored actual frequency.

Also the described method for controlling the overall power generation of the plurality of wind turbines may be in particular of advantage if the power transmission system is a HVDC power transmission system. This advantage will even be more important if the HVDC power transmission system comprises a rectifier for converting an AC power signal provided by the plurality of wind turbines into an DC power signal being fed into a HVDC power transmission line of the HVDC power transmission system.

The described common node may be defined for instance by a bus bar of the wind park and/or of the power transmission system. Thereby, the power converters of the plurality of wind turbines may be connected directly to the bus bar wire appropriate AC power transmission cable. Alternatively, the power converters of the plurality of wind turbines may be connected in an indirect manner, e.g. via one or more power transformers with the bus bar. The at least one power transformer may be in particular a so called step-up transformer which increases the voltage (and produces the current) of the respective AC power signal.

According to a further aspect of the invention there is provided a wind turbine comprising (a) a mechanical drive train having a wind rotor with at least two rotor blades; (b) an electric generator being mechanically connected to the drive train; (c) a power converter being electrically connected to the generator, wherein the power converter comprises (c1) an AC-DC generator bridge for rectifying an AC power signal provided by the generator, (c2) a direct current link for receiving the rectified AC power signal from the AC-DC generator bridge, and (c3) a DC-AC network bridge which converts a DC power of the DC link to an AC output power signal; (d) a rotor blade adjustment system for adjusting a pitch angle of the rotor blades; and (e) a wind turbine controller for controlling the operation of at least one of the power converter and the rotor blade adjustment system. The wind turbine controller is configured for carrying out the above described method for controlling the operation of a wind turbine.

Also this aspect of the invention is based on the idea that a power imbalance at a certain point within a power transmission system connecting the wind turbine with a power grid will cause a frequency variation. When recognizing that the mentioned frequency has changed to or with a certain extent, the power imbalance can be reduced at least partially by changing a power reference signal for the wind turbine controller.

In the language used in this document the wind turbine controller may be responsible for controlling both the rotor blade adjustment system and the power converter (in particular the DC-AC network bridge of the power converter).

In this respect it is pointed out that the wind turbine controller may be a single computing device or may alternatively be realized by means of two different computing devices, wherein one computing device is responsible for controlling the operation of the rotor blade adjustment system and the other computing device is responsible for controlling the operation of the power converter respectively of the DC-AC network bridge.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Figure 1:
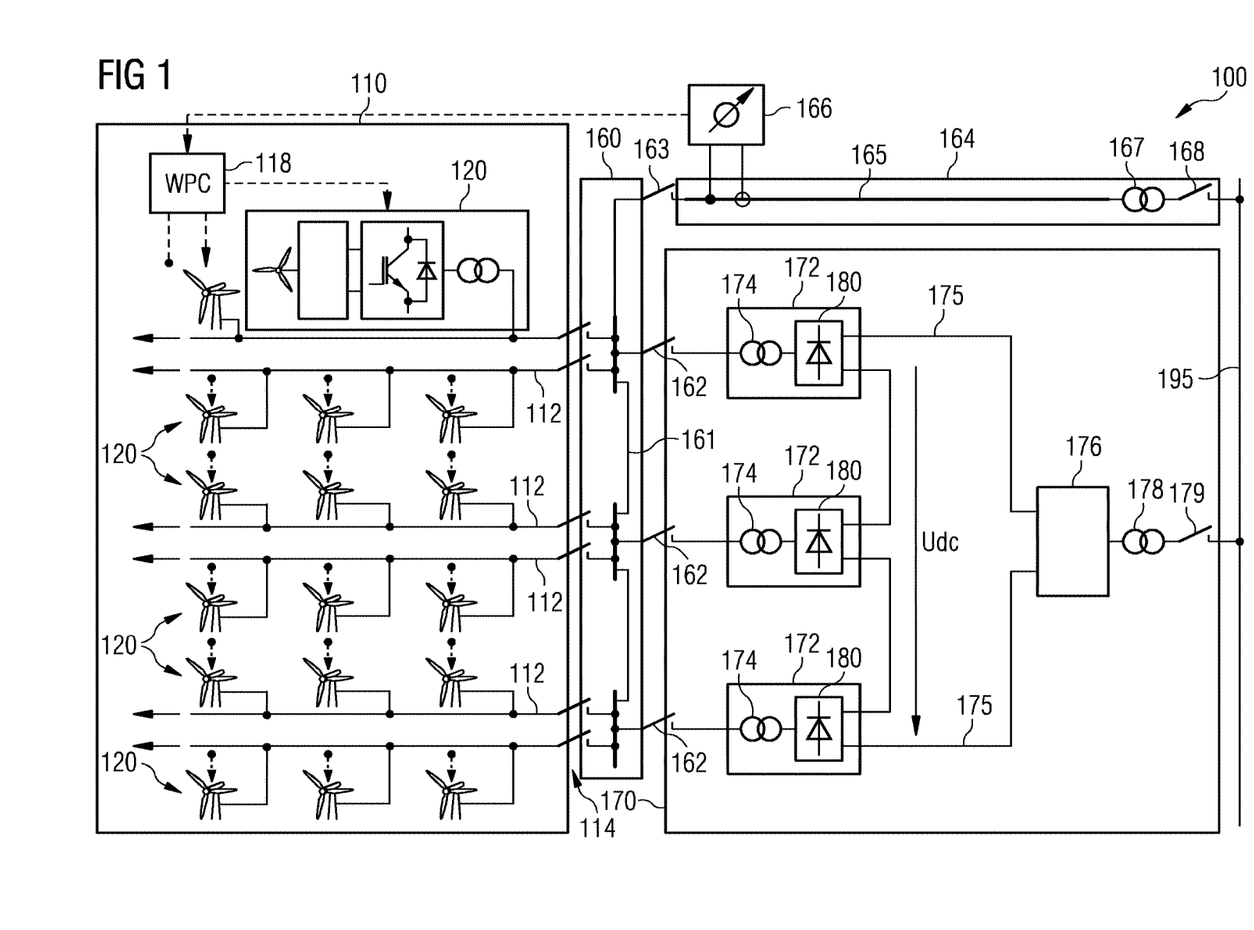
FIG. 1 shows a power generating and forwarding system comprising a wind park with a plurality of wind turbines in accordance with an embodiment of the invention.

FIG. 1 shows a power generating and forwarding system 100 comprising a wind park 110 with a plurality of wind turbines 120. The electric energy generated by the wind park 110, which according to the embodiment described here is located offshore, is forwarded via an AC system 160 and a HVDC power transmission system 170 to the power grid 195, which is located onshore.

The wind turbines 120 are arranged in groups, wherein each group is assigned to a bus bar 112. As indicated by the arrows at the left side of the illustration of the wind park 110, the number of wind turbines 120 being connected to one bus bar 112 is not restricted. Each bus bar 112 is connected via a circuit breaker 114 to the AC system 160, which will be further described below.

The wind park 110 comprises a central wind park controller (WPC) 118 which is communicatively connected to each one of the wind turbines 120 by means of control lines. In FIG. 1, within the wind park 110, these control lines are indicted by dashed lines. In order not to obscure FIG. 1 the dashed lines connecting the WPC 118 with the wind turbines 120 not being assigned to the upper most branch are depicted in an interrupted manner. The respective end points of the interruption are indicated as filled circles. It is pointed out the control lines respectively the corresponding data transfer via these control lines may be realized by means of a wired or a wireless data connection.

The WPC 118 may be a so called High Performance Park Pilot (HPPP) controller which acts as a superordinate controller for all individual wind turbine controllers (not depicted in FIG. 1). By supervising the individual wind turbine controllers the WPC 118 may control the operation of the individual wind turbines 120 in a coordinated manner. Further, via the control lines to the individual wind turbines 120, the WPC 118 can collect operational information regarding the individual wind turbines 120 and can transmit appropriate control signals to the respective individual wind turbine controllers.

Figure 2:
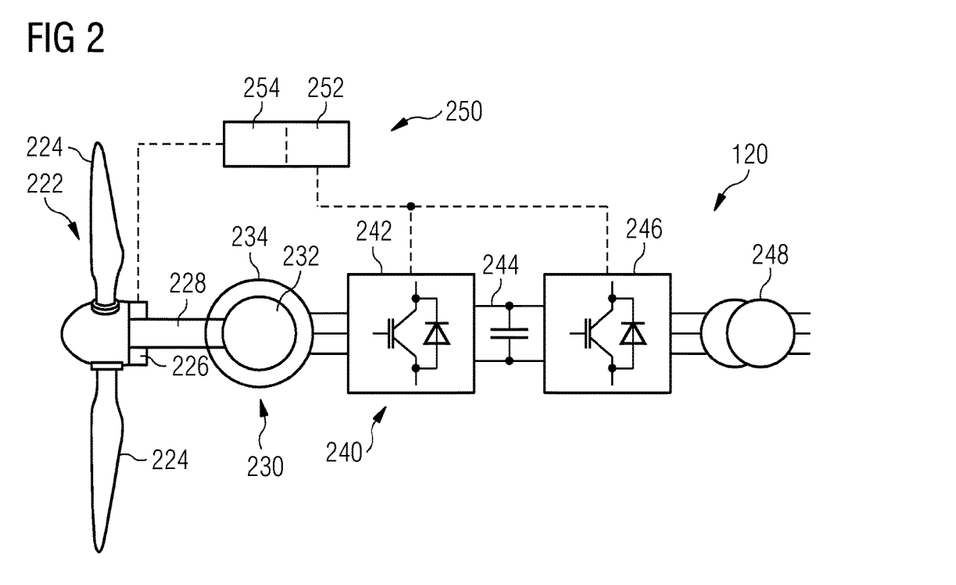
FIG. 2 shows a wind turbine of the wind park depicted in FIG. 1.

In the following a possible structural design of one wind turbine 120 will be described with reference to FIG. 2.

The wind turbine 120 comprises wind rotor 222, which is mounted to a drive shaft 228. The wind rotor 222 comprises a non-depicted hub, at which a certain number and preferably three rotor blades 224 are attached. Each rotor blade 224 can be rotated around its longitudinal axis by means of a rotor blade adjustment system 226 in order to adjust a pitch angle of the respective rotor blade 224. In accordance with basic principles of wind turbines, the pitch angle is an important parameter for the mechanical power, which will be extracted from the wind power being available in total.

The wind turbine 120 further comprises an electric generator 230, which includes a generator rotor 232, which is driven by the drive shaft 228. In this respect it is mentioned that the wind turbine 120 depicted here is a so called direct drive wind turbine 120, which does not comprise a gear box being connected between the wind rotor 222 and the generator 230 and which may be used for increasing the rotational speed of a further drive shaft being mechanically connected to the generator rotor 232. Of course, also a wind turbine having a configuration with a gear box can be used.

The electric generator 230 comprises a stator 234 having a winding system with which the electric power, typically a three phase power, is generated. Downstream with respect to the stator 234 there is connected a power converter 240. The power converter 240 comprises a generator (AC-DC) bridge 242, which in normal operation operates as an active rectifier to supply power to a direct current (DC) link 244. The power converter 240 further comprises a network bridge 246 which converts the DC power of the DC link 244 to an AC power signal. According to the embodiment described here this AC power signal comprises a three phase current and is fed to a step-up transformer 248. The output of the step-up transformer 248 is set to the respective bus bar 112 shown in FIG. 1.

The wind turbine 120 comprises and is controlled by a wind turbine controller 250. According to the embodiment described here, the wind turbine controller 250 comprises two controller portions, a converter controller 252 and a pitch controller 254. As indicated by the dashed lines in FIG. 2, the converter controller 252 controls the operation of (the semiconductor switches of) the power converter 240. The pitch controller 254 controls the operation of the pitch adjustment system 226, which is responsible for setting, depending on the actual operational state of the wind turbine 120, the blade pitch angle of each rotor blade 224.

Turning back to FIG. 1, the AC system 160 comprises a bus bar 161, power switches 162 and a switch 163. At the bus bar 161 the electric power collected by the bus bars 112 is summed up. When the power switches 162 are closed, the AC system 160 is connected to the HVDC power transmission system 170, which is described below in more detail.

According to the exemplary embodiment described here the power generating and forwarding system 100 comprises an auxiliary power transmission system 164. This system 164 comprises an auxiliary power transmission line or umbilical AC cable 165, by means of which an AC power connection between the power grid 195 and the wind park 110 can be established, if necessary. As has already been mentioned above, a power transfer via the umbilical AC cable 165 may be required for a start-up phase of at least some wind turbines 120 of the wind park 110 when the power generation of the other wind turbines 120 is not sufficient in order to allow for a reliable start-up procedure.

As can be seen from FIG. 1, the auxiliary power transmission system 164 comprises a transformer 167 and a power switch 168, which, together with the switch 163, can be used for activating respectively for deactivating the auxiliary power transmission system 164.

As can be further seen from FIG. 1, the AC auxiliary power transmission system 164 comprises a power measurement device 166 for measuring the power being shipped in particular from the power grid 195 to the wind park 110. The corresponding power measurement is carried out in a known manner via a voltage measurement and a current measurement as indicated in FIG. 1 with the two lines connecting the power measurement device 166 with the umbilical AC cable 165. The measured power value is forwarded to the WPC 118 which, when coordinating the operation of the wind turbines 120, takes into account the actual level of power being shipped via the umbilical AC cable 165.

The HVDC power transmission system 170 comprises a plurality of (in the depicted embodiment of the invention three) diode rectifier power modules 172, each comprising a three phase rectifier 180 and a respective three phase transformer 174. The diode rectifier power modules 172 are used for converting the provided AC power into a DC power. The diode rectifier power modules 172 are connected in such a manner that between one output terminal of the three phase rectifier 180 of the upper diode rectifier power module 172 and one output terminal of the three phase rectifier 180 of the lower diode rectifier power module 172 the DC power having a voltage Udc is provided.

As has already been mentioned above, according to the embodiment described here the wind park 110 is located offshore. The same holds for the diode rectifier power modules 172 and the power switches 162 and 163. For shipping the generated power from offshore to onshore a HVDC power transmission cable 175 is used. Onshore the HVDC power transmission system 170 comprises an onshore DC-AC converter 176 and a transformer 178, which deliver the resulting AC power with a proper phase and a proper amplitude to the power grid 195 (in case a power switch 179 is closed).

Figure 3:
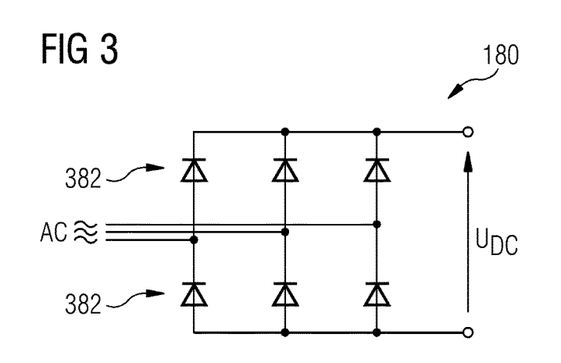
FIG. 3 shows a rectifier of the HVDC power transmission system depicted in FIG. 1.

FIG. 3 shows the rectifier 180 in more detail. By contrast to a power AC-DC converter having typically six controllable high power semiconductor switches, the rectifier 180 has only passive power electric components which are power diodes 382. As can be seen from FIG. 3, the rectifier 180 comprises three bridges each of which extending between two output terminals. Between these two output terminals the output Voltage $U_{DC}$ is provided. Each bridge comprises a series connection of two power diodes 382. At a not depicted intermediate node between the two power diodes 382 of each bridge there is applied one phase of a three phase AC power signal being fed into the rectifier 180.

In the following some information will be given for understanding the operational control method described in this document, wherein depending on a determined or measured frequency of an AC power output of the wind park being present e.g. at the bus bar 112 or the bus bar 161 shown in FIG. 1 a power reference signal for a wind turbine 120 is adjusted in such a manner that a power balance between received and shipped forward power is achieved at least approximately.

Within a conventional HVAC power transmission system a fundamental AC frequency is inherently balancing the power production and the load because of the electromechanical properties of the synchronous generators together with their governors.

In the operational control method described here the power converter of each wind turbine has similar properties in that the fundamental frequency within the offshore AC system will increase when the active power being generated is higher than the active power being removed from the offshore AC system and vice versa.

During a normal steady state operation of the whole power generating and forwarding system, the operational controls of the wind turbines are designed to act in such a way to alter the active power flow to shore in order to effectively balance the active power generation in the offshore AC system with the active power consumption removed by the onshore system. This together with a slow frequency controller means that provided that the power flow to shore is not limited, the frequency will be at or at least close to a set reference frequency.

In the event that the active power transmission is restricted or even blocked e.g. by a fault of the HVDC power transmission system, the wind turbines can no longer balance the active power available in the offshore AC system and the determined or measured frequency will change. Specifically, a maximum power limit caused by e.g. an onshore "Low Voltage Ride Through" (LVRT) event will cause the frequency to rise. Correspondingly, a minimum power limit e.g. because of an island operating of the wind park will cause the frequency to drop.

In this document a solution for this problem is proposed, wherein the active power limits are imposed on the active power reference within each wind turbine. (1) A maximum limit is applied when the determined or measured frequency is increased and (2) a minimum limit is applied when this frequency is low. It is understood that a maximum power limit will limit the active power production to less than what would be possible by the available wind, and a minimum power limit will cause the wind rotor of the respective wind turbine to slow down. Eventually, the respective wind turbine may even be disconnected from the respective bus bar.

Figure 4:
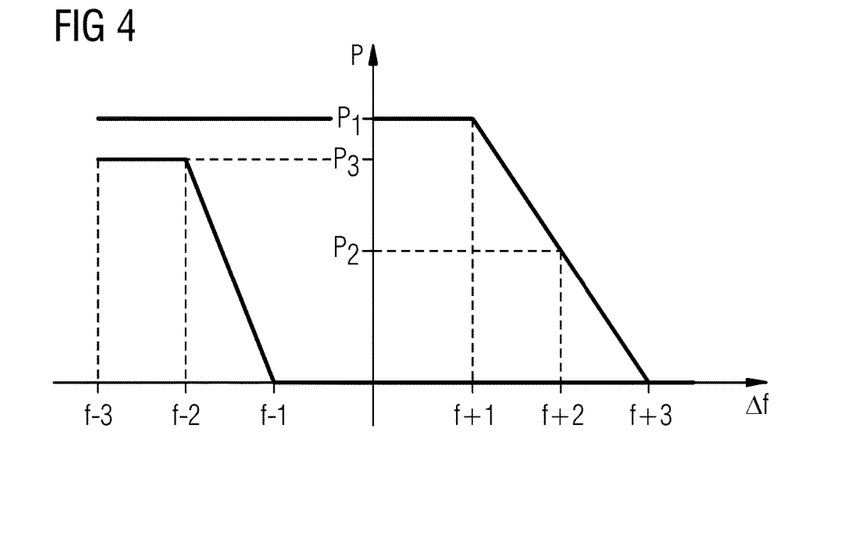
FIG. 4 shows in accordance with an embodiment of the invention a diagram depicting limits for the power reference signal depending on a frequency deviation.

FIG. 4 shows an example of such limits. In this Figure
P is the value of a power reference signal for an individual wind turbine relative to the available active power (depending on the actual wind conditions).
Δf is the change in frequency relative to the frequency reference within the respective wind turbine.
P1, P2, and P3 are power reference set points lodged in a look up table.
f−3, f−2, and f−1 are delta frequency set points within the lookup table to define the minimum active power reference and f+1, f+2, and f+3 are delta frequency set points within the lookup table to define the maximum active power reference.

Figure 5:
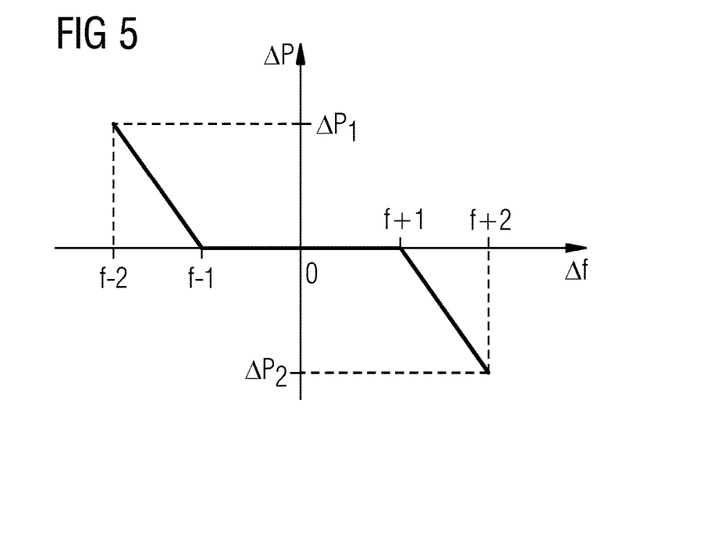
FIG. 5 shows in accordance with a further embodiment of the invention a diagram depicting limits for the changed power reference signal depending on a frequency deviation.

FIG. 5 shows an further example of such limits. In this Figure
ΔP is the value of s change of a power reference signal for an individual wind turbine relative to the available active power (depending on the actual wind conditions).
Δf is the change in frequency relative to the frequency reference within the respective wind turbine.
ΔP1 and ΔP2 are delta power reference set points lodged in a look up table.
f−2 and f−1 are delta frequency set points within the lookup table to define the minimum active power reference and f+1 and f+2 are delta frequency set points within the lookup table to define the maximum active power reference.

It is pointed out that in FIGS. 4 and 5 the limits are given as delta limits i.e. power deviation relative to the available active power and frequency deviation relative to the set frequency reference. However, also absolute values or combination of relative and absolute values could be used.

In the following another approach for controlling the operation of a wind turbine will be presented. This approach relies on a differentiation in time of the determined or measured frequency. With this approach a fault of the HVDC power transmission system and/or of the power grid, which fault causes a disruption of the power flow, can be detected in a fast and reliable manner:

Within a normal range of operating conditions for a wind turbine the rate of change of a power flow is typically limited for example to 20%/s by a ramp rate for a power reference (signal), which is provided to an internal wind turbine controller. An upper limit for the rate of change of power can be defined as a post fault power recovery ramp rate, for example 200%/s. In the event of an onshore grid fault, a power flow via the HVDC power transmission system is disrupted and the DC link voltage of the HVDC power transmission system will rise. This will have the effect of transiently reducing the power flow from the offshore system into the HVDC power transmission system. As a consequence, each wind turbine will respond by increasing its frequency in an attempt to satisfy its local power reference, and, since all wind turbines of the wind park will do this simultaneously, the offshore frequency will rise very quickly, much faster than the rate of change of offshore frequency expected within the normal range of operation.

A similar situation arises in the event of an offshore fault: The power flow into the HVDC power transmission system is reduced and all the wind turbines try to compensate this by trying to increase their frequency resulting in a significant frequency change over time (df/dt).

With the operational control method described in this document also this problem can be at least mitigated by using a df/dt value exceeding a predefined threshold as a mechanism for each wind turbine being able to autonomously detect that a significant disruption in the power balance has occurred. In a consequential control action within the respective individual wind turbine the level of an internal power reference signal will be reduced and the operation of the wind turbine will be controlled in a corresponding manner. In this context the value of df/dt is used as a (grid) fault detection mechanism.

In a similar manner during significant disruptions of the power flow, outwith the normal operational range, a power error within a wind turbine will show similar characteristics to a df/dt detection mechanism. Therefore, the power error may be a similar indicator of power imbalance within the offshore system and could be used for the wind turbines to make a similarly autonomous detection of a (grid) fault. The power error could also have a threshold and a duration characteristic applied to it to reject offshore disturbances associated e.g. with a transformer switching, filter energization etc. in order to make the (grid) fault detection more noise immune.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A method for controlling the operation of a wind turbine power transmission system, said wind turbine power transmission system having a plurality of wind turbines, each of said plurality of wind turbines including (i) a mechanical drive train, (ii) an electric generator being mechanically connected to the drive train, and (iii) a power converter being electrically connected to the generator, the method comprising:
    assigning at least one group of the plurality of wind turbines to a wind park bus bar;
    connecting the wind park bus bar to an AC system bus bar, wherein the AC system bus bar is configured to connect to an HVDC power transmission system and to an auxiliary power transmission system, wherein both the HVDC power transmission system and the auxiliary power transmission system are connected to an AC power grid, further wherein the auxiliary power transmission system is capable of providing power to a wind turbine of the plurality of wind turbines and measuring a phase angle between the AC signal of the AC power grid and the AC signal present at the wind park;
    determining a frequency of an AC output voltage signal received by the AC system bus bar;
    recognizing whether there has been a modification of the determined frequency with respect to a previously determined frequency, which modification is larger than a given threshold;
    if the modification of the determined frequency is larger than the given threshold, changing a power reference signal for at least a first wind turbine of the at least one group of the plurality of wind turbines;
    providing the changed power reference signal to a controller of the first wind turbine of the at least one group of the plurality of wind turbines; and
    controlling the operation of the first wind turbine on the basis of the changed power reference signal;
    wherein the frequency is determined at a node which is defined by the AC system bus bar, and
    wherein the HVDC power transmission system connects to the AC power grid by a HVDC power transmission line and the auxiliary power transmission is connected to the AC power grid by an auxiliary power transmission line.

2. The method as set forth in claim 1, wherein
    a power converter of the HVDC power transmission system comprises a rectifier.

3. The method as set forth in claim 2, wherein the auxiliary power transmission line is electrically arranged in parallel with respect to the HVDC power transmission line and connects the power grid with the node.

4. The method as set forth in claim 1,
    wherein controlling the operation of the first wind turbine on the basis of the changed power reference signal comprises at least one of:
        controlling the operation of the power converter and in particular controlling the operation of a DC-AC network bridge of the power converter; and
        controlling a pitch angle of blades of a wind rotor of the first wind turbine.

5. The method as set forth in claim 1, wherein
    the modification of the determined frequency is an increase of the value of the determined frequency and
    the given threshold is a predetermined upper boundary value for the determined frequency.

6. The method as set forth in the preceding claim 4, wherein
    the modification of the determined frequency is the absolute value of a change of the value of the determined frequency and
    the given threshold is a predetermined threshold value for the absolute value of the change.

7. The method as set forth in the preceding claim 6, wherein
    within a certain allowable frequency range the power reference signal is kept constant.

8. The method as set forth in claim 1, wherein
    the modification of the determined frequency is a differentiation with respect to time of the determined frequency and
    the given threshold condition comprises an upper boundary value for a value of the differentiation with respect to time of the determined frequency.

9. The method as set forth in claim 1, wherein
    the power reference signal for the wind turbine is confined within a predefined range.

10. The method as set forth in claim 9, wherein
    within the predefined range for the power reference signal a change of the power reference signal is proportional to the difference between the determined frequency and a desired frequency corresponding to an operational state with a power balance between the power being generated by the wind park and the power being delivered to the AC power grid via the wind turbine power transmission system.

11. A method for controlling an overall power generation of a plurality of wind turbines of a wind park,
    wherein each wind turbine includes (i) a mechanical drive train, (ii) an electric generator being mechanically connected to the drive train, and (iii) a power converter being electrically connected to the generator, and
    wherein the plurality of power converters are electrically connected to a common node of a power transmission system connecting the wind park with a power grid, the method comprising
        controlling the operation of at least a portion of all the wind turbines by respectively carrying out the method as set forth in claim 1.

12. A wind turbine comprising
a mechanical drive train having a wind rotor with at least two rotor blades;
an electric generator being mechanically connected to the drive train;
a power converter being electrically connected to the generator; wherein the power converter comprises (i) an AC-DC generator bridge for rectifying an AC power signal provided by the generator, (ii) a direct current link for receiving the rectified AC power signal from the AC-DC generator bridge, and (iii) a DC-AC network bridge which converts a DC power of the DC link to an AC output power signal;
a rotor blade adjustment system for adjusting a pitch angle of the rotor blades; and
a wind turbine controller for controlling the operation of at least one of the power converter and the rotor blade adjustment system;
wherein the wind turbine controller is configured for carrying out the method as set forth in claim 1.

13. The method as set forth in claim 2, wherein the rectifier is an active rectifier.

14. The method as set forth in claim 1, wherein the power converter includes a generator bridge which includes a series of semiconductor power switching devices fully controlled and regulated using a pulse width modulation (PWM).

15. The wind turbine as set forth in claim 12, wherein the power converter further comprises a network bridge which converts the DC power of the DC link to an AC power signal, which in voltage, frequency, and phase angle is matched to the respective electric quantities of the power grid.

16. The method as set forth in claim 1, wherein the step of assigning at least one group of the plurality of wind turbines to a bus bar further comprises: assigning at least a second group of the plurality of wind turbines to a second bus bar.

17. The method as set forth in claim 1, wherein the step of controlling the operation of the wind turbine on the basis of the changed power reference signal further comprises: opening or closing a power switch on at least one of the wind park bus bar and the AC system bus bar.

* * * * *